(12) United States Patent
Herbold

(10) Patent No.: US 7,511,515 B2
(45) Date of Patent: Mar. 31, 2009

(54) SYSTEM FOR PROVIDING POWER OVER COMMUNICATION CABLE HAVING MECHANISM FOR DETERMINING RESISTANCE OF COMMUNICATION CABLE

(75) Inventor: Jacob Herbold, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 11/334,456

(22) Filed: Jan. 19, 2006

(65) Prior Publication Data

US 2006/0164108 A1    Jul. 27, 2006

Related U.S. Application Data

(60) Provisional application No. 60/646,509, filed on Jan. 25, 2005.

(51) Int. Cl.
G01R 27/26 (2006.01)
H04M 9/00 (2006.01)

(52) U.S. Cl. .................... 324/691; 324/713; 324/76.11; 455/402

(58) Field of Classification Search ................ 324/691, 324/713, 76.11; 455/402
See application file for complete search history.

(56) References Cited

U.S. PATENT DOCUMENTS 4,868,815 A * 9/1989 Iwamura et al. ............. 370/485
6,483,318 B1 * 11/2002 White et al. ................ 324/539
6,973,394 B2 12/2005 Jaeger et al.
2002/0191553 A1 12/2002 Lehr et al.
2004/0212423 A1 10/2004 Inagaki
2005/0268120 A1 * 12/2005 Schindler et al. ............ 713/300
2006/0063509 A1 * 3/2006 Pincu et al. ................. 455/402
2006/0100799 A1 * 5/2006 Karam ........................ 702/57
2006/0112288 A1 * 5/2006 Schindler .................... 713/300

FOREIGN PATENT DOCUMENTS

| CN | 1364026 A | 8/2002 |
|---|---|---|
| CN | 1157022 C | 7/2004 |
| CN | 1540858 A | 10/2004 |

OTHER PUBLICATIONS

Chinese Office Action issued in Chinese Patent Application No. 200680005472X dated Nov. 7, 2008.
Chinese Office Action issued in Chinese Patent Application No. 2006800031997 dated Nov. 7, 2008.
Chinese Office Action issued in Chinese Patent Application No. 2006800031925 dated Nov. 7, 2008.

* cited by examiner

*Primary Examiner*—Vincent Q Nguyen
(74) *Attorney, Agent, or Firm*—McDermott Will & Emery LLP

(57) ABSTRACT

Novel system and methodology for determining resistance of wires in a communication cable having at least two pairs of wires used for providing power from a power supply device to a powered device. A measuring mechanism may determine DC resistance of the wires before the power supply device applies power to the communication cable.

13 Claims, 10 Drawing Sheets

SYSTEM FOR PROVIDING POWER OVER COMMUNICATION CABLE HAVING MECHANISM FOR DETERMINING RESISTANCE OF COMMUNICATION CABLE

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for determining resistance of a communication cable in a system for providing power over the communication cable.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. Based on the determined class of the PD, the PSE applies the required power to the PD.

The IEEE 802.3af standard describes power distribution over the Ethernet by using the common mode voltage between 2 sets of twisted pairs within the CAT-5 cable. Presently the specification calls for distribution of up to 13 W over 4 of the 8 wires typically contained in the unshielded twisted pair (UTP) CAT-5 cable. However, power distributed over the cable may be increased. Due to safety regulations, it is difficult to increase the voltage sent over the cable. Thus, the current must be increased above the present 350 mA maximum. When the current increases, resistance in the CAT-5 wiring absorbs more energy. This can lead to heating the cable or reducing power being available for consumption at the end of the cable.

The cable resistance can be reduced by using all of the wires in the CAT-5 cable. This should cut the cable resistance in half. If all of these wires are used to deliver power, it becomes extremely important to ensure the connectivity and conductivity of all 8 wires in the cable.

To reduce power loss in the cable and ensure that the cable is capable of carrying the power, it would be desirable to create a measuring mechanism to determine resistance of wires in the cable.

The PoE system treats a pair of wires connected to the same transformer winding as a single conductor. Therefore, there is a need to measure the DC resistance of each of these pairs.

Moreover, the PoE system connects 2 wires together through a transformer's winding. Thus, wires are connected in pairs with the winding forming a DC short circuit between them. If one of these wires has much higher resistance than the other, the transformer will saturate, blocking Ethernet data transmission. Therefore, it would be desirable to determine the individual resistance of each wire in the cable independently of each other.

SUMMARY OF THE DISCLOSURE

The present disclosure offers a novel system and methodology for determining resistance of wires in a communication cable having at least two pairs of wires used for supplying power from a power supply device to a powered device.

For example, a measuring mechanism of the present disclosure may be provided in a system for supplying power to a powered device over Ethernet cabling.

In particular, the measuring mechanism may determine DC resistance of the pairs of wires. The resistance may be determined before the power supply device applies power to the communication cable.

In accordance with one aspect of disclosure, the measuring mechanism may determine resistance of a first pair of wires independently of resistance of a second pair of wires.

In accordance with another aspect of the disclosure, the measuring mechanism may determine resistance of one wire in the communication cable independently of resistance of the other wires in the cable.

In accordance with an embodiment of the disclosure, the communication cable may comprise first and second sets of wires, each of which is composed of two pairs of wires.

The measuring mechanism may have a signaling circuit for providing an indication signal to indicate to a powered device that a measurement procedure is initiated. The powered device may enable a shunt regulator in response to the indication signal.

Further, the measuring mechanism may comprise a current forcing circuit for providing a predetermined current in the first set of wires. In response to this current, the shunt regulator may produce an input voltage value of the powered device.

The measuring mechanism may comprise a voltage measuring circuit for measuring a first voltage value on the first set of wires and a second voltage value of the second set of wires. The second voltage value may correspond to the input voltage value of the powered device.

The measuring mechanism may determine resistance of the first set of wires based on a difference between the first voltage value and the second voltage value, and a value of the predetermined current.

Further, the measuring mechanism may determine resistance of any two pairs of wires in the communication cable to determine individual resistance of one pair of wires independently of resistance of the other pairs.

In accordance with another embodiment of the disclosure, the measuring mechanism may comprise a current forcing circuit for providing a predetermined current in first and second pairs of wire in a cable composed of two pairs of wires. A voltage measuring circuit may measure a first voltage value across the first and second pairs at the power supply device side of the cable in response to the predetermined current.

Also, an input voltage of the powered device is applied between the first and second pairs in response to the predetermined current. A sample and hold circuit may provide sampling and holding of the input voltage to produce a sampled and held value of the input voltage.

The voltage measuring circuit may measure a second voltage value across the first and second pairs at the power supply device side of the cable when the predetermined current is turned off. The second voltage value corresponds to the sampled and held value of the input voltage.

Resistance of the first and second pairs may be determined based on a difference between the first voltage value and the second voltage value, and a value of the predetermined current.

In accordance with a further embodiment of the disclosure, a current forcing circuit provides a predetermined current in the first and second pairs. In response to the predetermined current, an input voltage value of the powered device proportional to a reference voltage value is applied between the first and second pairs.

A voltage measuring circuit measures a first voltage value between the first and second pairs at the power supply device side in response to the predetermined current, and measures a second voltage value between the first and the second pair at the power supply device side when the predetermined current is turned off. The second voltage value corresponds to the reference voltage value.

Resistance of the first and second pairs based on a difference between the first voltage value and the input voltage value proportional to the second voltage value, and a value of the predetermined current.

In accordance with a further embodiment of the disclosure, a system for supplying power may comprise a transformer with split windings for coupling the power supply device to a pair of wires in the communication cable. Each of the split windings is connected to a wire of the pair of wires. A capacitive element may be provided between the split windings for preventing DC connection between the split windings. As a result, resistance of one wire may be determined independently of resistance of the other wires in the cable.

In accordance with a further aspect of the disclosure, a local area network may comprise at least a pair of network nodes, a network hub, and communication cabling having at least first and second pairs of wires for connecting the network nodes to the network hub to provide data communications. The network hub has a power supply device for providing power to a load over the communication cabling. The network includes a measurement mechanism for determining resistance of the wires.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a measuring mechanism for determining cable resistance in a PoE system. It will become apparent, however, that the concepts described herein are applicable to any system for providing power over a cable. For example, the system of the present disclosure may be provided in a local area network (LAN) having a plurality of nodes, a network hub and communication cabling connecting the nodes to the network hub for providing data communications. The network hub may include a power supply device for supplying power to a load over the communication cabling. A measuring mechanism of the present disclosure may be provided for determining resistance of the communication cabling.

Figure 1:
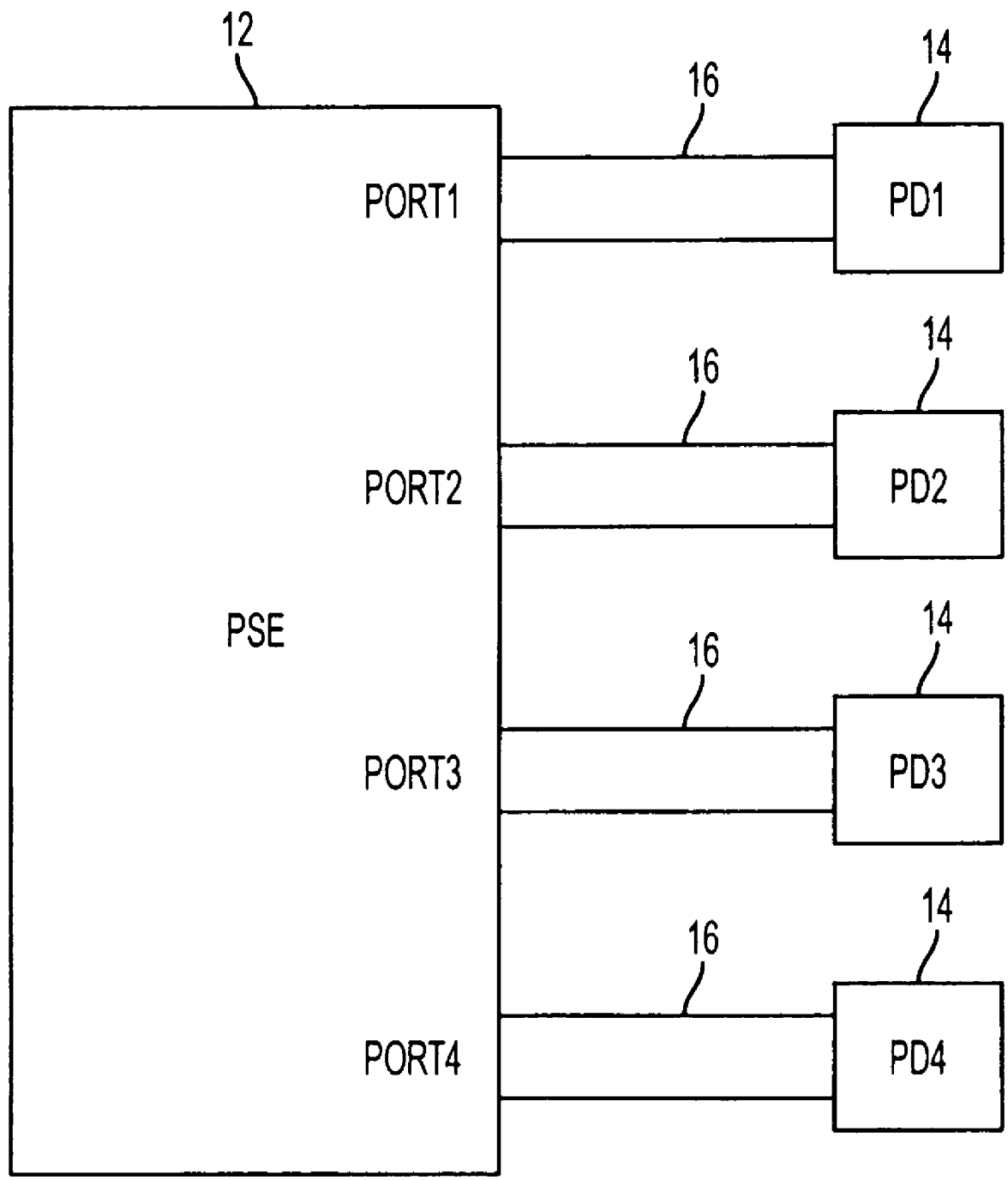
FIG. 1 is diagram illustrating a PoE system of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices 14 (PD1 to PD4) via respective links, each of which may be provided using 2 or 4 sets of twisted pairs within an Ethernet cable 16. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

Figure 2:
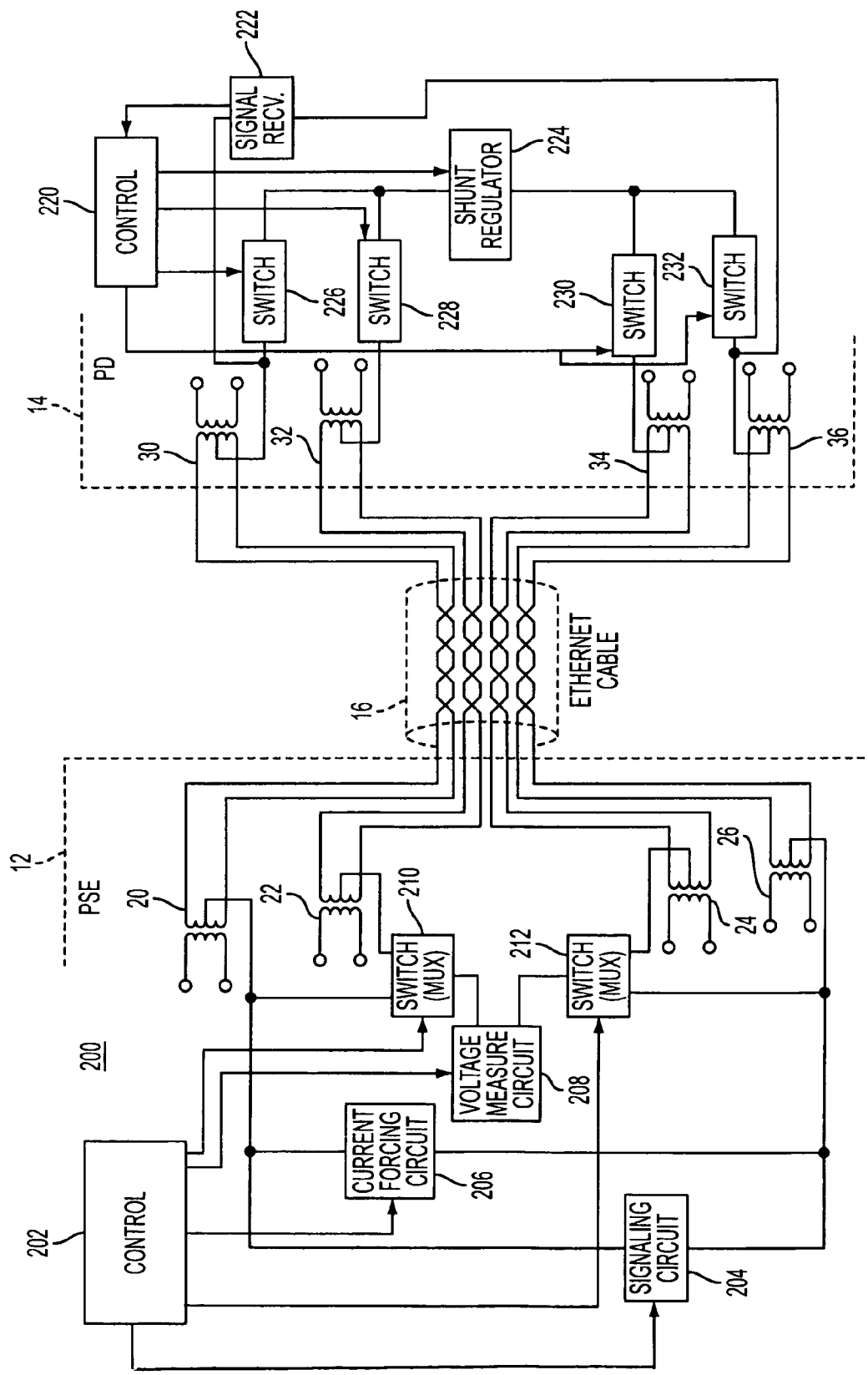
FIG. 2 is a diagram illustrating a first exemplary embodiment of the present disclosure.

As shown in FIG. 2, the power may be applied via 4 twisted pairs of the Ethernet cable 16 that connects each port of the PSE 12 to the respective PD 14. The PSE 12 may be coupled to 4 twisted pairs of wires in the cable 16 using transformers 20, 22, 24 and 26 coupled between the respective twisted pairs and Ethernet physical layer (PHY) devices arranged for providing data communications in an Ethernet network. On the PD side, the PD 14 may be coupled to the 4 twisted pairs of wires in the cable 16 using transformers 30, 32, 34 and 36 connected between the respective twisted pairs and Ethernet PHY devices. The PoE interface defined in the IEEE 802.3af standard may be used for connecting the PSE 12 and the PD 14 to the Ethernet cable 16.

The PoE interface to the cable 16 is electrically isolated from both the PD's and PSE's chassis, and hence from earth ground. Therefore, providing current through the cable 16 involves a send and a return path though the cable. Usually, two twisted pairs are used together for supplying power from the PSE 12 to the PD 14—one as a send path and another as a return path.

The PSE 12 may include a measuring mechanism 200 for determining DC resistance of the cable 16 comprising a control circuit 202, a signaling circuit 204, a current forcing circuit 206, a voltage measuring circuit 208, and multiplexing switches 210 and 212. The circuits 204 and 206 may be coupled between the transformers 20 and 26 connected to the outer twisted pairs of wires. The multiplexing switches 210 and 212 may connect the voltage measuring circuit 208 to the transformers 20 and 26 connected to the outer twisted pairs or to the transformers 22 and 24 connected to the inner twisted pairs of wires.

To support a cable resistance measurement procedure, the PD 14 may include a control circuit 220, a signal receiver 222, a shunt regulator 224, and switches 226, 228, 230 and 232. The signal receiver 222 may be coupled to the transformers 30 and 36 connected to the outer twisted pairs. The switches 226, 228, 230 and 232 may respectively connect the shunt regulator 224 to the transformers 30, 32, 34, and 36. For example, MOSFETs may be used as the switches 226-232.

The control circuits 202 and 220 may respectively control PSE and PD circuits involved in a cable resistance measurement procedure. In particular, the control circuit 202 may control the signaling circuit 204 to produce an indication signal informing the PD that a cable resistance measurement procedure is initiated. The indication signal is received by the signal receiver 222 that provides the respective signal to the control circuit 220. In response to the indication signal, the control circuit 220 closes the switches 226, 228, 230 and 232 to connect the shunt regulator 224 via the transformers 30, 32, 34 and 36 to the respective twisted pairs.

After producing the indication signal, the control circuit 202 controls the current forcing circuit 206 to force a current of a predetermined value I onto the twisted pairs being measured. For example, FIG. 1 illustrates the case, in which DC resistance of the outer twisted pairs connected to the transformers 20 and 26 is determined. Therefore, the predetermined current I is forced onto the outer twisted pairs. As discussed in more detail later, the measuring mechanism 100 may determine DC resistance of all possible combinations of the twisted pairs to determine resistance of each twisted pair independently of resistance of the other twisted pairs.

The forced predetermined current I causes a current to flow through the shunt regulator 224 that creates constant input voltage $V_{IN}$ between the outer twisted pairs on the PD side. As all switches 226-232 are closed, the input voltage $V_{IN}$ is also produced between the inner twisted pairs connected to the transformers 32 and 34.

The control circuit 202 controls the multiplexing switches 210 and 212 to enable the voltage measuring circuit 208 to measure voltage $V_1$ between the outer twisted pairs on the PSE side and voltage $V_2$ between the inner twisted pairs on the PSE side. The voltage $V_2$ is equal to the voltage $V_{IN}$ produced between the inner twisted pairs on the PD side.

Based on these voltage measurements, the control circuit 202 may determine round trip DC resistance R of the outer twisted pairs as $R=(V_1-V_2)/I$.

Figure 3A:
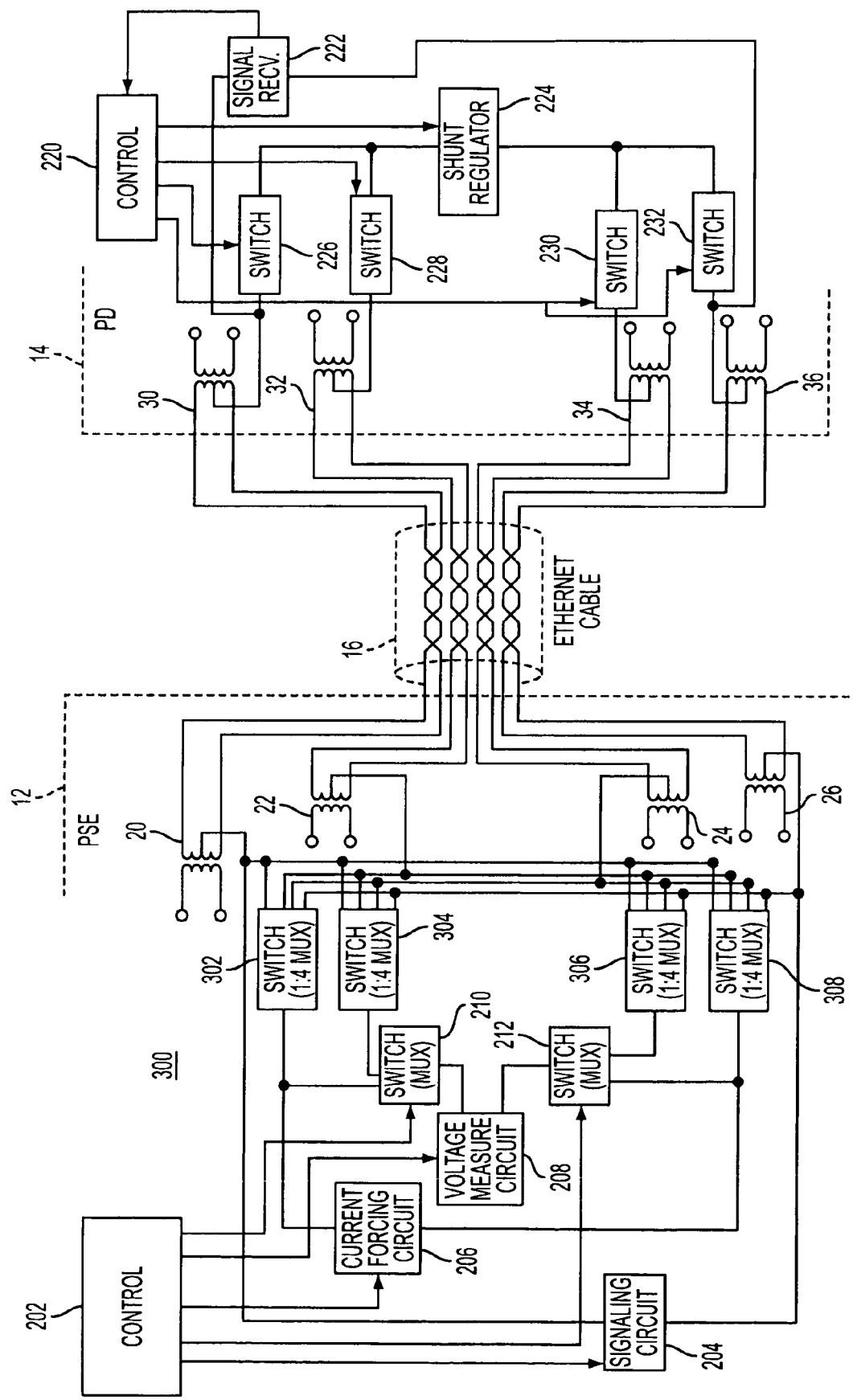
FIG. 3a is a diagram illustrating a second exemplary embodiment of the present disclosure.

The arrangement in FIG. 2 may be modified to determine the DC resistance of any twisted pair of wires in the cable 16. In particular, FIG. 3a illustrates an embodiment of the present disclosure, in which in addition to the elements shown in FIG. 2, a measuring mechanism 300 for determining DC resistance of the cable 16 further contains 4 multiplexing switches 302, 304, 306 and 308, each of which has 1 input and 4 outputs. Each of the multiplexing switches 302, 304, 306 and 308 may be controlled by the control circuit 202 to determine round trip DC resistance of all possible combinations of the twisted pairs.

As discussed above in connection with FIG. 2, to determine the round trip DC resistance of the outer twisted pairs, the current forcing circuit 206 may be connected via the multiplexing switches 302 and 308 to the transformers 20 and 26 corresponding to the outer twisted pairs. As a result, the current forcing circuit 206 may be enabled to force the predetermined current I onto the outer twisted pair. Further, to measure the voltage $V_1$ between the twisted pairs, onto which the predetermined current is forced, the voltage measuring circuit 208 may be connected via the switches 210 and 302 to the outer twisted pair coupled to the transformer 20, and via the switches 212 and 308 to the outer twisted pair coupled to the transformer 26. To measure the voltage $V_2$ corresponding to the input voltage $V_{IN}$ of the PD 14, the voltage measuring circuit 208 may be connected via the switches 210 and 304 to the inner twisted pair coupled to the transformer 22, and via the switches 212 and 306 to the inner twisted pair coupled to the transformer 24.

In a similar way, the current forcing circuit 206 may be connected to any two twisted pairs being measured to force the predetermined current onto them, and the voltage measuring circuit 208 may be connected to the same two twisted pairs to determine the voltage $V_1$ between them, and to the other two twisted pairs to determine the voltage $V_2$ between them.

Accordingly, for a cable composed of twisted pairs A, B, C and D, the measuring mechanism 300 may determine the round trip DC resistance R of the pairs A and B, pairs A and C, pairs A and D, pairs B and C, pairs B and D, and pairs C and D in the above-described manner. Based on these round trip resistances, the control circuit 202 may determine the DC resistance of each individual twisted pair A, B, C or D independently of the resistance of the other twisted pairs in the cable.

Figure 3B:
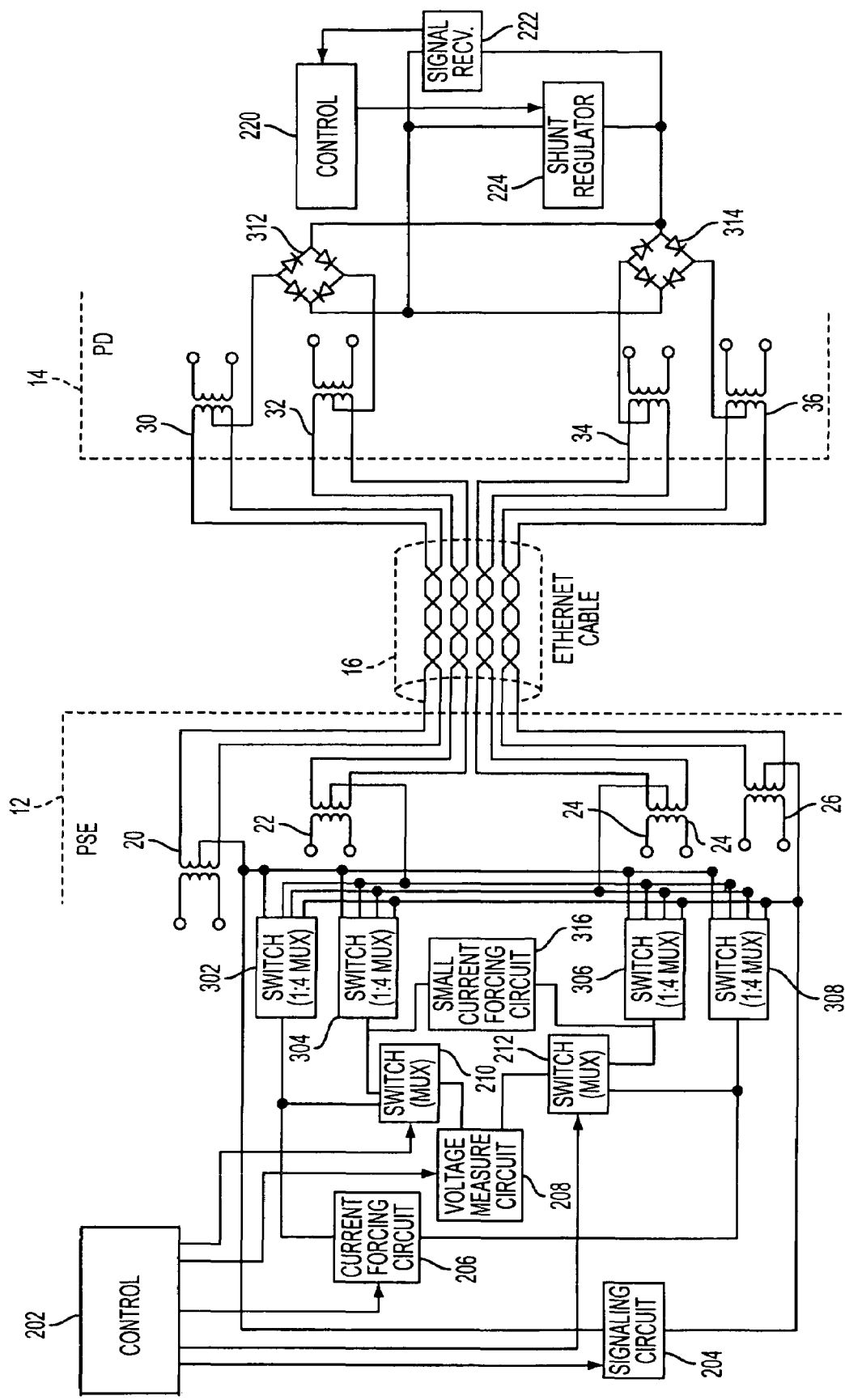
FIG. 3b is a diagram illustrating a third exemplary embodiment of the present disclosure.

FIG. 3b shows an arrangement similar to that of FIG. 3a. However, the PD 14 uses diode bridges 312 and 314 instead of switch elements 226, 228, 230 and 232. The use of the diode bridges 312 and 314 is typical in 802.3af PDs. Due to the polarity of the diodes in the bridges, the PD 14 is unable to put a copy of the input voltage VIN from the pair being measured onto the pair not being measured. To compensate for this, the PSE 12 now includes a second current forcing circuit 316. This circuit puts a very small current, which is unlikely to cause much voltage drop across the cable, on the pairs not being measured. This small current forward biases diodes in the bridge such that a replica of $V_{IN}$ is now on the pairs not being measured. In all other ways, the measurement proceeds as described for FIG. 3a.

The addition of the diode bridges 312 and 314 adds one more complication to the cable resistance measurement. This is related to the forward voltage across the diodes of the diode bridges, which for silicon diodes is typically about 0.6V but varies with temperature. If the diodes a placed in close physical proximity, they will have roughly the same temperature and hence roughly the same voltage drop. The only difference in the drop across the diodes will be due to the different currents flowing through them. Thus, the diode resistance will be incorporated into the measured cable resistance.

It is noted that in all of the cable resistance measurement methods described herein, although diode bridges are not shown in the PD and a small current source is not shown in the PSE, the addition of these elements will allow any of the methods to read back a voltage from the PD that would be otherwise blocked by the polarity of diodes in the PD.

Figure 3C:
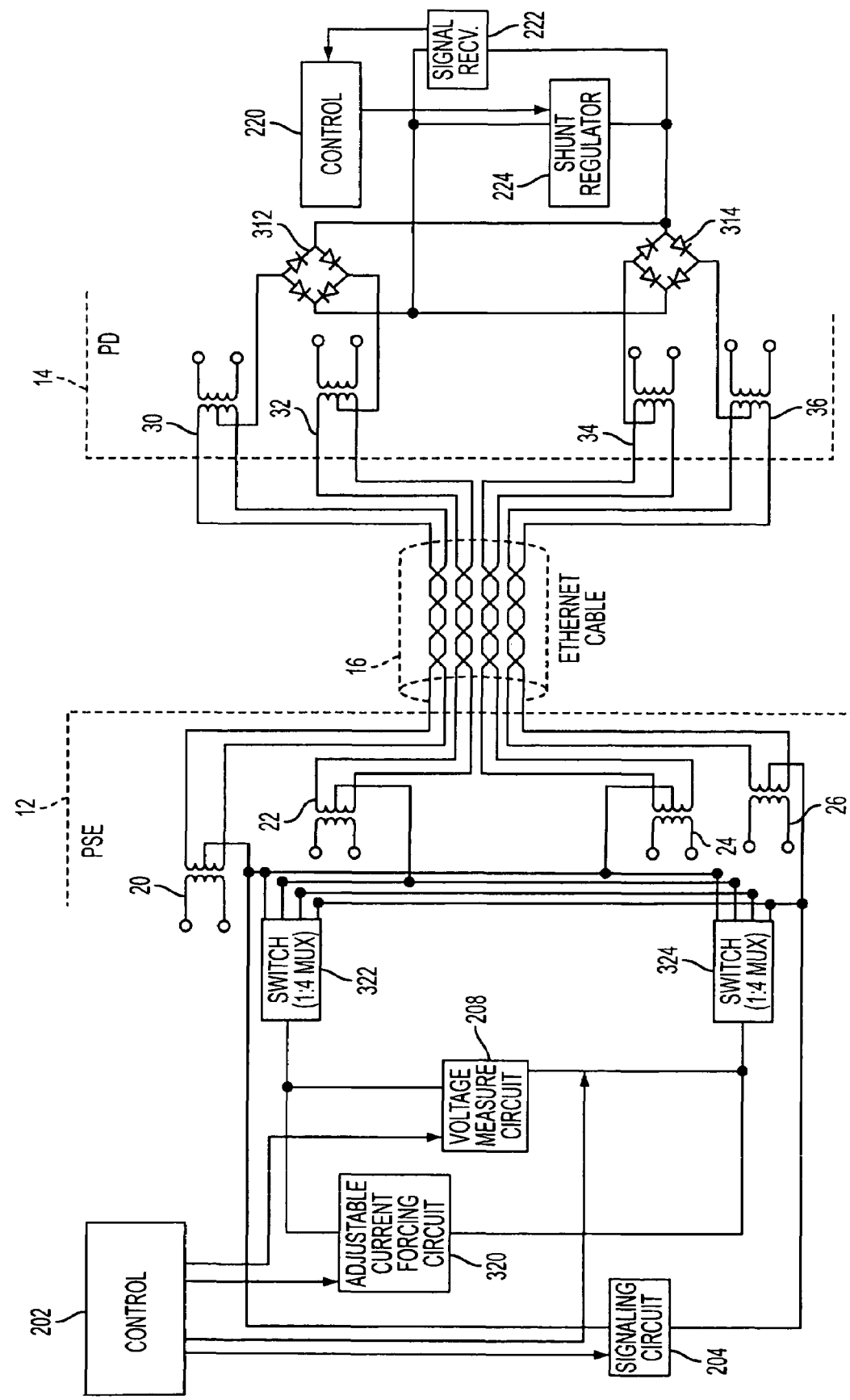
FIG. 3c is a diagram illustrating a fourth exemplary embodiment of the present disclosure.

Another variation of the FIG. 3a measurement method that a PSE may employ is to change the current of its current forcing circuit between a large value, designed to produce relatively large voltage drop across the cable, and a relatively small value designed to produce very little drop across the cable. FIG. 3c shows the PSE 12 including an adjustable current forcing circuit 320 that does this. It is noted that the PSE 12 needs only connection to 2 pairs of wires at a time. Therefore, in the FIG. 3c arrangement, the PSE 12 includes only 2 switches 322 and 324 instead of 4 switches 302, 304, 306 and 308 shown in FIGS. 3a and 3b. Measuring the voltage at the PSE's output with these 2 different currents has the same effect as described above. The voltage at high current is $V_1$ and at low current the voltage is $V_2$. Putting these into the same $R=(V_1-V_2)/I$ equation gives the cable resistance. As just mentioned, the resistance of diodes in the PD 14 are also included in the resulting resistance R.

The accuracy of the measurement procedures described above depends on the voltages $V_1$ and $V_2$ which are both measured directly by the circuitry in the PSE. This avoids any dependence on parameters of the particular PD connected to the PSE. However simultaneous measurement of $V_1$ and $V_2$ utilizes all of the wires in the Ethernet cable; and it could be difficult to reliably and inexpensively construct switches 226 thru 232 to pass the voltages and currents necessary for this measurement. The use of diode bridges in FIGS. 3b and 3c solves the switch problem. While adjusting the PSE's forcing current (FIG. 3c), eliminates the need for using all the pairs at once.

Figure 4:
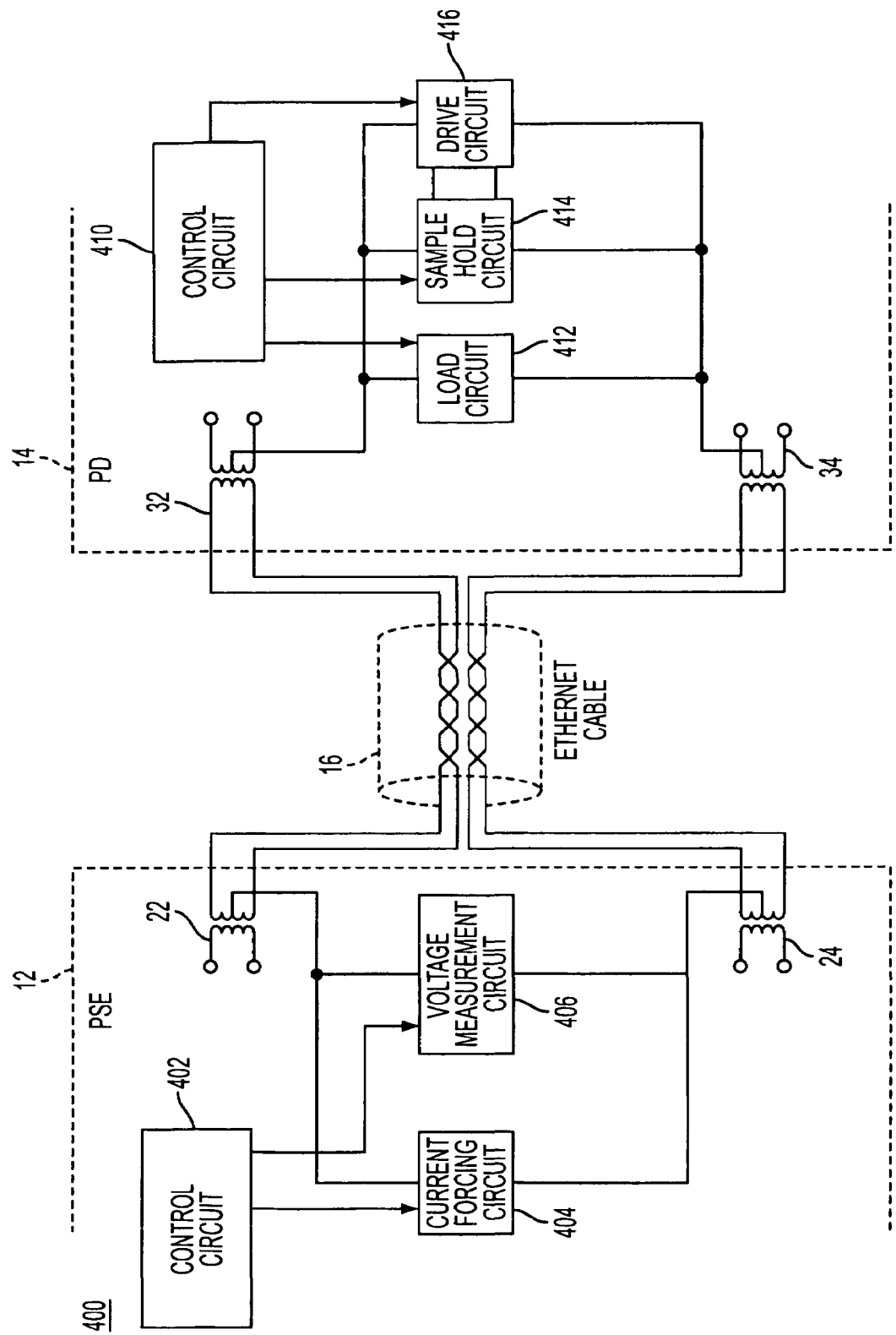
FIG. 4 is a diagram illustrating a fifth exemplary embodiment of the present disclosure.

FIG. 4 illustrates a measuring mechanism 400 for determining DC resistance of 2 twisted pairs in the Ethernet cable 16 using a procedure in which the PD 14 communicates the voltage $V_2$ back to the PSE 12. This eliminates the need for switches 226 thru 232 and the simultaneous use of all wires in the Ethernet cable. For example, FIG. 4 illustrates measuring DC resistance of the twisted pairs coupled to the transformers 22 and 24 on the PSE side and to the transformers 32 and 34 on the PD side. The measuring mechanism 400 in the PSE 12 may include a control circuit 402 that controls a current forcing circuit 404 and a voltage measuring circuit 406 connected between the transformers 22 and 24. To support the measurement, the PD 14 may include a control circuit 410 that controls a load circuit 412, a sample and hold circuit 414 and a drive circuit 416 connected between the transformers 32 and 34.

The measurement procedure is initiated by the control circuit 402 that controls the current forcing circuit 404 to produce a predetermined current I forced via terminals of the PSE 12 onto the twisted wires. The predetermined current I supplied to the load circuit 412 connected between terminals of the PD 14 causes an input voltage $V_{IN}$ between the terminals. For example, the load circuit 412 may be a resistor or any other circuit creating an impedance between the terminals of the PD 14.

When the input voltage $V_{IN}$ stabilizes, the control circuit 410 controls the sample and hold circuit 414 to capture this voltage. At the same time, the control circuit 402 controls the voltage measuring circuit 406 connected between the terminals of the PSE 12 to measure voltage $V_1$ between these terminals.

Thereafter, the control circuit 402 turns off the current forcing circuit 404 to prevent the current I from flowing through the cable 16. In response, the control circuit 410 controls the drive circuit 416 to drive the voltage $V_{IN}$ captured by the sample and hold circuit 414 onto the cable 16. A switching circuit, such as a MOSFET circuit, may be used as the drive circuit 416.

On the PSE side, the voltage measuring circuit 406 measures voltage $V_2$ corresponding to the voltage $V_{IN}$, and the control circuit 402 calculates the round trip DC resistance R of the twisted pairs as $R=(V_1-V_2)/I$.

Figure 5:
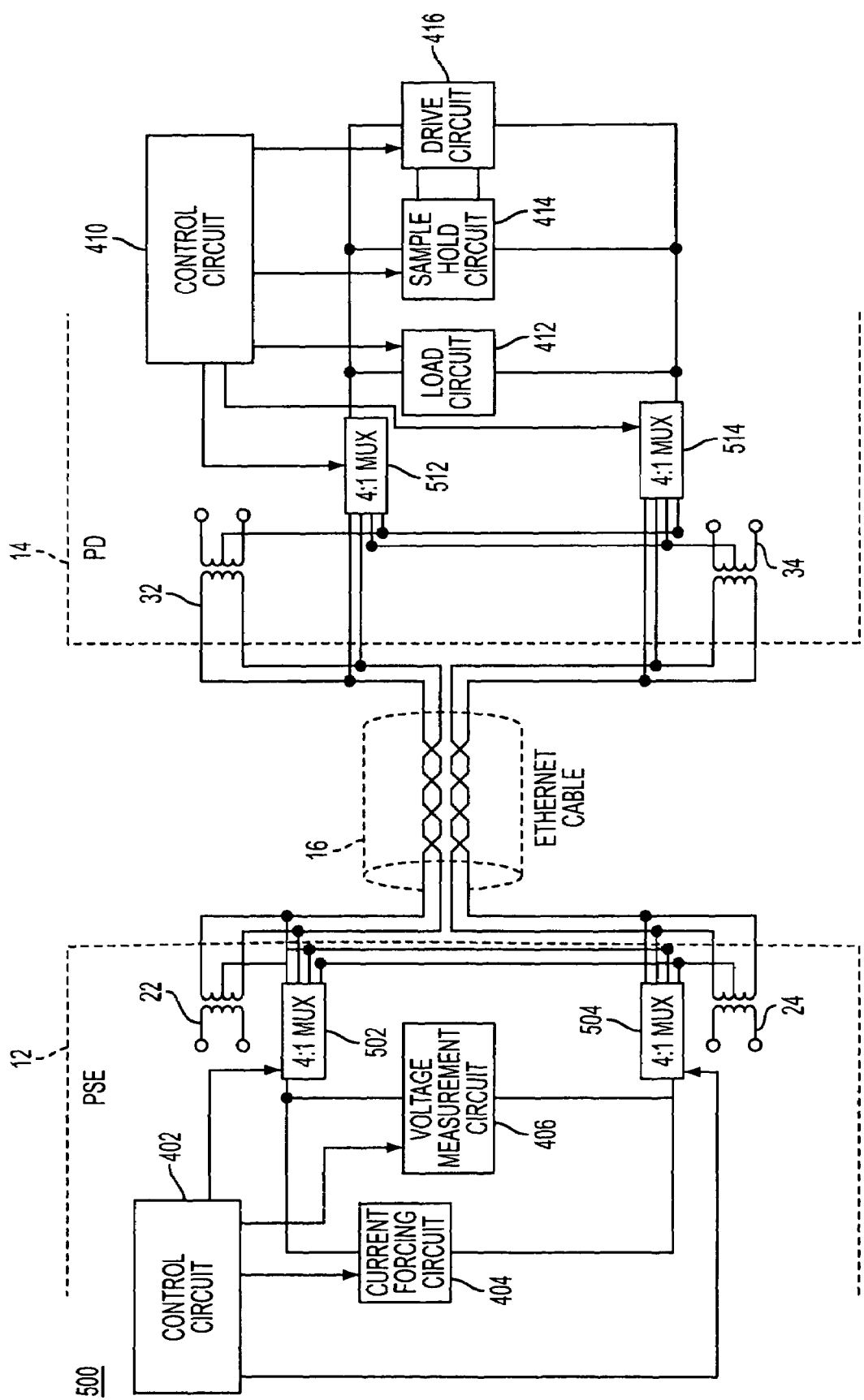
FIG. 5 is a diagram illustrating a sixth exemplary embodiment of the present disclosure.

The arrangement in FIG. 4 may be modified to determine the individual DC resistance of any twisted pair independently of the resistance of another twisted pair. In particular, FIG. 5 illustrates an embodiment of the present disclosure, in which in addition to the elements shown in FIG. 4, a measuring mechanism 500 for determining DC resistance of the cable 16 further contains two multiplexing switches 502 and 504 provided on the PSE side. Also, two multiplexing switches 512 and 514 may be provided on the PD side. Each of the multiplexing switches 502, 504, 512 and 514 may have 1 input and 4 outputs. The multiplexing switches 502 and 504 may be controlled by the controlled circuit 402, whereas the multiplexing switches 512 and 514 may be controlled by the control circuit 410.

The respective control circuits may control the switches 502, 504, 512 and 514 to determine resistance of all possible combination of 4 twisted pairs in the cable 16. Although FIG. 5 does not show connections of the 4 twisted pairs to preserve the clarity of the diagram, one skilled in the art would realize that the twisted pairs may be connected to the PSE 12 and the PD 14 in a manner similar to the arrangement in FIG. 2.

To determine the round trip DC resistance of 2 selected twisted pairs A and B in a cable including twisted pairs A, B, C and D, the control circuit 402 controls the switches 502 and 504 to connect the current forcing circuit 404 and the voltage measuring circuit 406 across the selected twisted pairs A and B. Also, the switches 512 and 514 may connect the load current 412, sample and hold circuit 414 and the driver circuit 416 across the same selected twisted pairs A and B. The round trip DC resistance of the selected twisted pairs A and B may be determine in the manner described above in connection with FIG. 4.

Thereafter, the control circuits may control the switches to successively connect the respective elements across pairs A and C, pairs A and D, pairs B and C, pairs B and D, and pairs C and D to determine the round trip DC resistance of each of these pairs in the above-described manner. Based on these round trip resistances, the control circuit 402 may determine the DC resistance of each individual twisted pair A, B, C or D independently of the resistance of the other twisted pairs in the cable.

Figure 6:
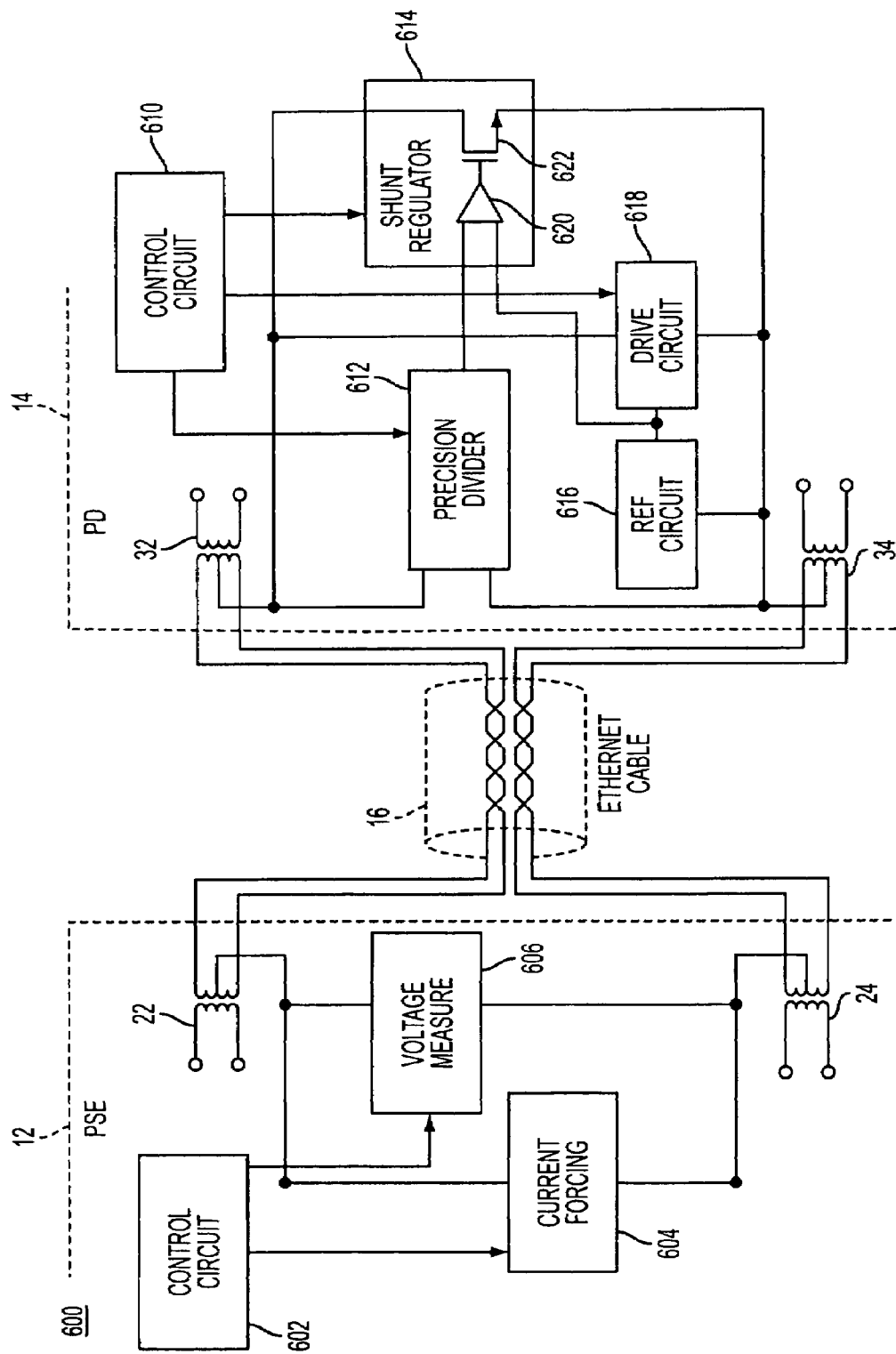
FIG. 6 is a diagram illustrating a seventh exemplary embodiment of the present disclosure.

FIG. 6 illustrates another exemplary embodiment of a mechanism for determining DC resistance of 2 twisted pairs in the Ethernet cable 16. For example, the twisted pairs shown in FIG. 6 are coupled to the transformers 22 and 24 on the PSE side and to the transformers 32 and 34 on the PD side. A measuring mechanism 600 in the PSE 12 may include a control circuit 602 that controls a current forcing circuit 604 and a voltage measuring circuit 606 connected between the transformers 22 and 24. To support the measurement, the PD 14 may include a control circuit 610 that controls a precision divider 612, a shunt regulator 614, a reference circuit 616 and a drive circuit 618.

The measurement procedure is initiated by the control circuit 602 that controls the current forcing circuit 404 to produce a predetermined current I forced via terminals of the PSE 12 onto the twisted wires. In response to the forced current I, the control circuit 620 controls the precision divider 612 to provide a predetermined fraction 1/N of the input voltage $V_{IN}$ produced between the twisted pairs at the PD side of the cable 16.

The shunt regulator 614 contains an error amplifier 620 and an output MOSFET driver 622. The error amplifier 620 compares the voltage $V_{IN}/N$ produced by the precision divider 612 with predetermined reference voltage $V_{REF}$ provided at the output of the reference circuit 616. As a result, input voltage $V_{IN}=N\times V_{REF}$ is produced at the output of the shunt regulator 614.

The control circuit 602 controls the voltage measuring circuit 606 to measure voltage $V_1$ at the PSE side of the cable 16. During this measurement, the shunt regulator 614 maintains the voltage $V_{IN}=N\times V_{REF}$ at its output. At the same time, the PD 14 may use some of the current flowing through it to supply an energy storage circuit (not shown).

Then, the control circuit 602 turns off the current forcing circuit 604 to prevent the current I from flowing through the cable 16. In response, the control circuit 610 turns off the shunt regulator 614.

Thereafter, the control circuit 610 provides supply of the reference circuit 616 and the drive circuit 618 with the power accumulated in the energy storage circuit. The drive circuit 618, which may be a switching circuit, such as a MOSFET circuit, applies the reference voltage $V_{REF}$ onto the twisted pairs.

The control circuit 602 controls the voltage measuring circuit 606 to measure the voltage between the twisted pairs at the PSE side. This voltage is equal to the reference voltage $V_{REF}$. When this measurement completes, the control circuit 602 determines the round trip resistance R of the twisted pairs as $R=(V_1-V_{REF}\times N)/I$.

Figure 7:
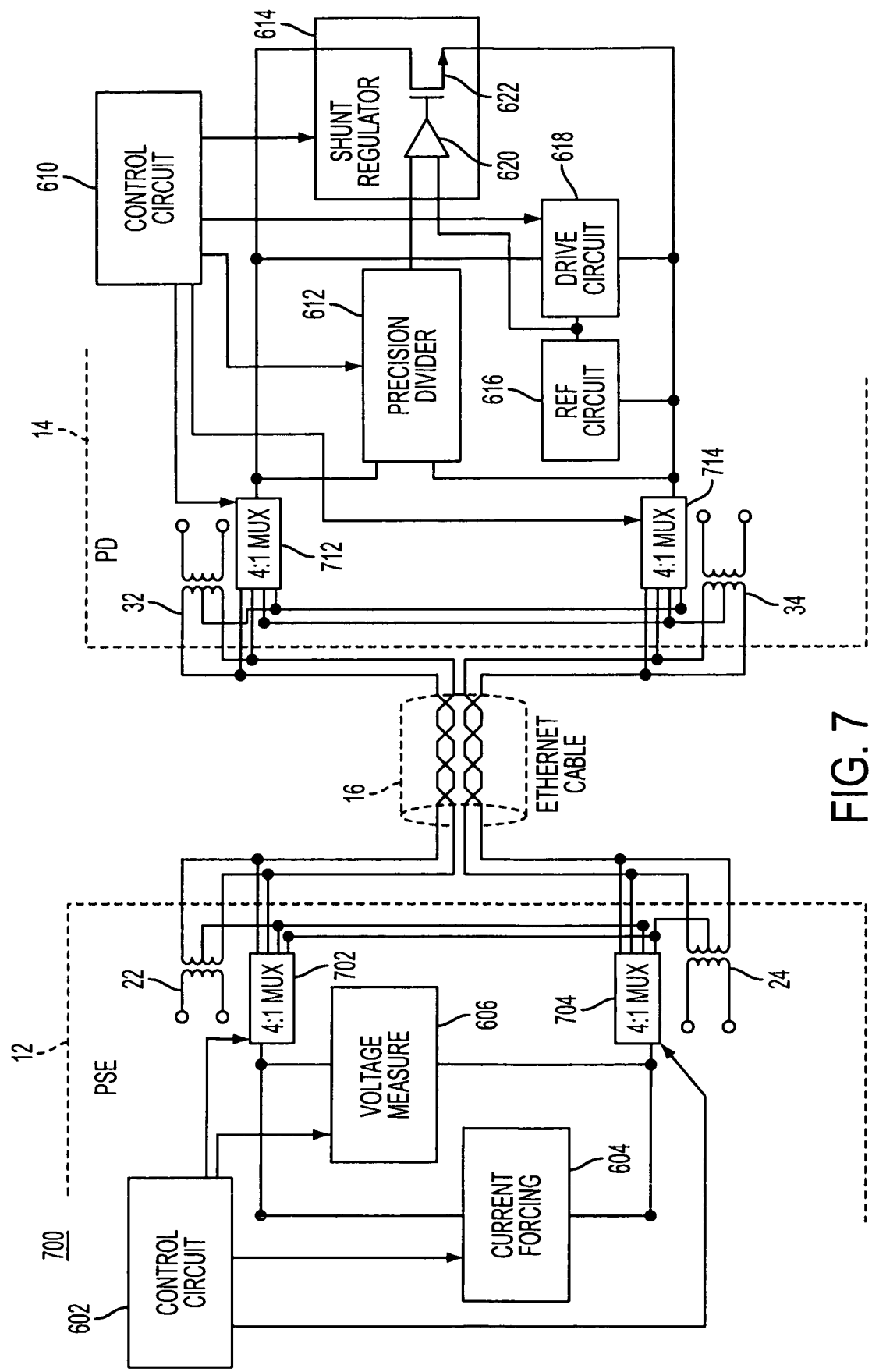
FIG. 7 is a diagram illustrating an eighth exemplary embodiment of the present disclosure.

The arrangement in FIG. 6 may be modified to determine the individual DC resistance of any twisted pair independently of the resistance of another twisted pair. In particular, FIG. 7 illustrates an embodiment of the present disclosure, in which in addition to the elements shown in FIG. 6, a measuring mechanism 700 for determining DC resistance of the cable 16 further contains two multiplexing switches 702 and 704 provided on the PSE side. Also, two multiplexing switches 712 and 714 may be provided on the PD side. Each of the multiplexing switches 702, 704, 712 and 714 may have 1 input and 4 outputs. The multiplexing switches 702 and 704 may be controlled by the controlled circuit 602, whereas the multiplexing switches 712 and 714 may be controlled by the control circuit 610.

The respective control circuits may control the switches 702, 704, 712 and 714 to determine resistance of all possible combination of 4 twisted pairs in the cable 16. Although FIG. 7 does not show connections of the 4 twisted pairs to preserve the clarity of the diagram, one skilled in the art would realize that the twisted pairs may be connected to the PSE 12 and the PD 14 in a manner similar to the arrangement in FIG. 2.

To determine the round trip DC resistance of 2 selected twisted pairs A and B in a cable including twisted pairs A, B, C and D, the control circuit 602 controls the switches 702 and 704 to connect the current forcing circuit 604 and the voltage measuring circuit 606 across the selected twisted pairs A and B. Also, the switches 712 and 714 may connect the PD cable measuring circuitry across the same selected twisted pairs A and B. The round trip DC resistance of the selected twisted pairs A and B may be determine in the manner described above in connection with FIG. 6.

Thereafter, the control circuits may control the switches to successively connect the respective PSE and PD cable measuring circuitries across pairs A and C, pairs A and D, pairs B and C, pairs B and D, and pairs C and D to determine the round trip DC resistance of each of these pairs in the above-described manner. Based on these round trip resistances, the control circuit 602 may determine the DC resistance of each individual twisted pair A, B, C or D independently of the resistance of the other twisted pairs in the cable.

Figure 8:
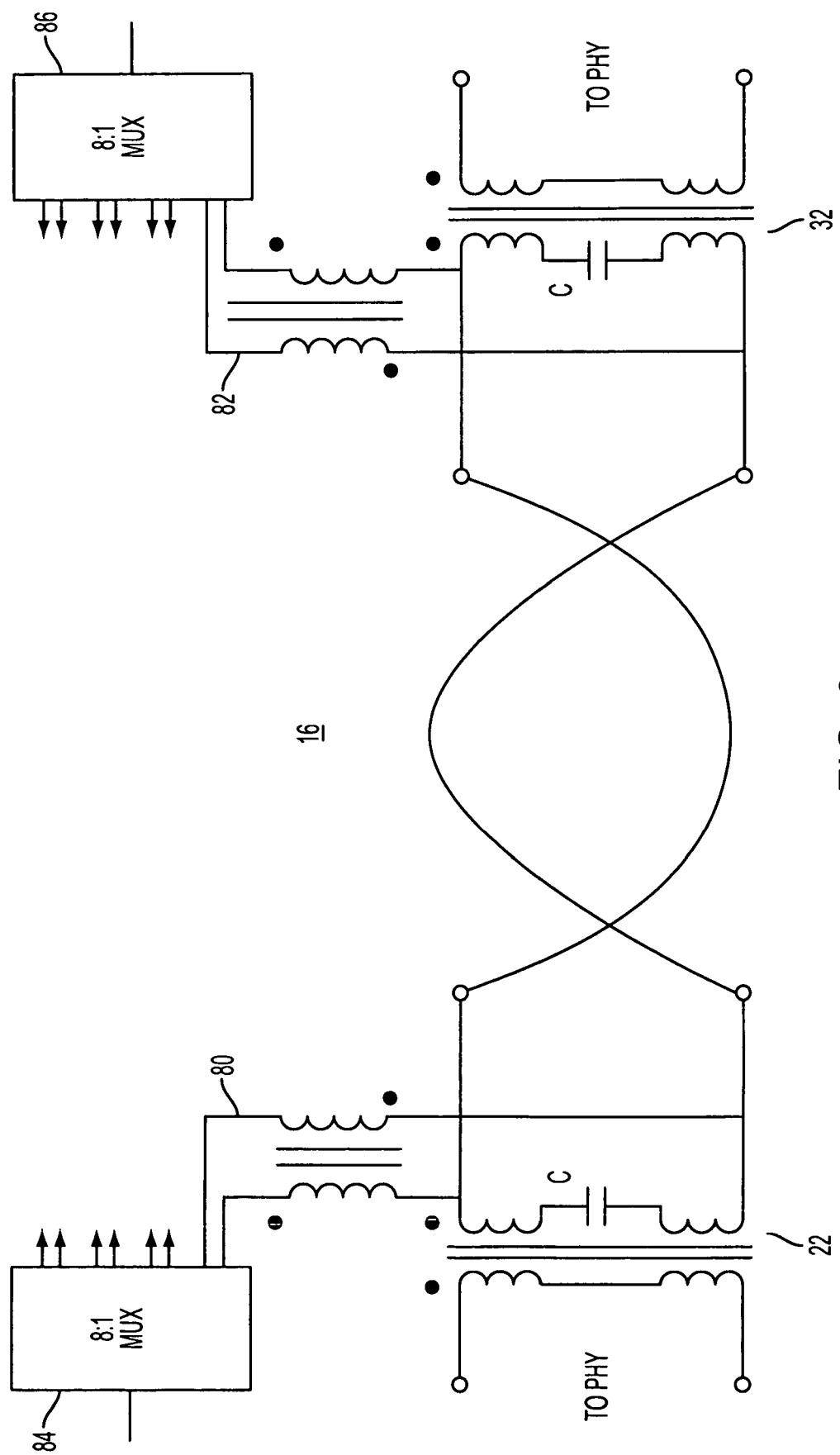
FIG. 8 is a diagram illustrating a ninth exemplary embodiment of the present disclosure.

Moreover, the arrangements in FIGS. 2-7 may be modified to measure DC resistance of each wire in an 8-wire cable. As shown in FIG. 8, each transformer used for connecting a twisted pair in the cable 16 may be split into two windings corresponding to two wires in the twisted pair. To preserve the clarity of the diagram, only transformer 22 on the PSE side and the transformer 32 on the PD side are shown. However, one skilled in the art would realize that the other transformers shown in FIG. 2 may be arranged in the same way.

A capacitor C may be connected between the split windings of each transformer to provide an AC path for Ethernet data but prevent DC current from flowing through the windings. Thus, the wires within each twisted pair are no longer DC connected to each other. Accordingly, the DC resistance of each wire can be measured separately.

Via transformers 80 and 82, the transformers 22 and 32 may be coupled to outputs of multiplexing switches 84 and 86. Each of the multiplexing switches 84 and 86 has 1 input and 8 outputs for connecting the PSE cable measuring circuitry and the PD cable measuring circuitry to a selected wire among the 8 wires of the cable 16. Another pair of similar multiplexing switches (not shown) may be provided to connect the PSE cable measuring circuitry and the PD cable measuring circuitry to another selected wire.

A control circuit in the PSE 12 may control each of the multiplexing switches in the PSE and a control circuit in the PD 14 may control each of the multiplexing switches in the PD to successively connect the respective PSE and PD cable measuring circuitries to each wire in the cable in order to determine the round trip DC resistance of each combination of the wires in a manner similar to any of the cable measurement procedures described above in connection with FIGS. 2-7. As a result, a cable measuring mechanism of the present disclosure may determine the DC resistance of each wire independently of the resistance of the other wires. As one skilled in the art would realize, the modification shown in FIG. 8 is applicable to any of cable resistance measuring arrangements, for example, to the arrangements shown in FIGS. 2, 4 and 6.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power over a communication cable having a first set of wires and a second set of wires, each of the first and second sets being composed of two pairs of wires, the system comprising:
    a power supply device for providing power over the communication cable to a powered device, and
    a measuring mechanism configured for determining resistance of the first set of wires and having a voltage measuring circuit for measuring a first voltage value on the first set of wires and a second voltage value on the second set of wires, the second voltage value corresponding to an input voltage value of the powered device,
    wherein the measuring mechanism comprises a signaling circuit for providing an indication signal to indicate to the powered device that a measurement procedure is initiated.

2. The system of claim 1, wherein the powered device is configured for enabling a shunt regulator in response to the indication signal.

3. The system of claim 2, wherein the measuring mechanism further comprises a current forcing circuit for providing a predetermined current in the first set of wires.

4. The system of claim 3, wherein the shunt regulator is configured for providing the input voltage value of the powered device.

5. The system of claim 3, wherein the current forcing circuit is configured for providing multiple different magnitudes of current.

6. The system of claim 5, wherein the measuring mechanism further comprises a voltage measuring circuit for measuring voltage values on the wires corresponding to the different magnitudes of current produced by the current forcing circuit.

7. A system for providing power over a communication cable having a first set of wires and a second set of wires, each of the first and second sets being composed of two pairs of wires, the system comprising:
    a power supply device for providing power over the communication cable to a powered device, and
    a measuring mechanism configured for determining resistance of the first set of wires and having a voltage measuring circuit for measuring a first voltage value on the first set of wires and a second voltage value on the second set of wires, the second voltage value corresponding to an input voltage value of the powered device,
    wherein the measuring mechanism is configured for determining resistance of the first set of wires based on a difference between the first voltage value and the second voltage value, and a value of the predetermined current.

8. A system for providing power over a communication cable having a first set of wires and a second set of wires, each of the first and second sets being composed of two pairs of wires, the system comprising:
    a power supply device for providing power over the communication cable to a powered device, and
    a measuring mechanism configured for determining resistance of the first set of wires and having a voltage measuring circuit for measuring a first voltage value on the first set of wires and a second voltage value on the second set of wires, the second voltage value corresponding to an input voltage value of the powered device,
    wherein the measuring mechanism is configured for determining resistance of any two pairs of wires in the communication cable to determine individual resistance of one pair of wires independently of resistance of other pairs.

9. A system for providing power over a communication cable having at least first and second pairs of wires, comprising:
    a power supply device for providing power over the communication cable to a powered device, and
    a measuring mechanism for determining resistance of the first and second pairs of wires,
    wherein the communication cable is composed of the first pair of wires and the second pair of wires,
    the measuring mechanism comprises a current forcing circuit for providing a predetermined current in the first and second pairs, and a voltage measuring circuit for measuring a first voltage value across terminals of the power supply device in response to the predetermined current,
    the powered device is configured for providing an input voltage of the powered device between the first and second pairs in response to the predetermined current, and for sampling and holding the input voltage to produce a sampled and held value of the input voltage.

10. The system of claim 9, wherein the voltage measuring circuit is configured for measuring a second voltage value across the terminals of the power supply device when the predetermined current is turned off, the second voltage value corresponding to the sampled and held value of the input voltage.

11. The system of claim 10, wherein the measuring mechanism is configured for determining resistance of the first and second pairs based on a difference between the first voltage value and the second voltage value, and a value of the predetermined current.

12. A system for providing power over a communication cable having at least first and second pairs of wires, comprising:
    a power supply device for providing power over the communication cable to a powered device, and
    a measuring mechanism for determining resistance of the first and second pairs of wires,
    wherein the communication cable is composed of the first pair of wires and the second pair of wires,
    in response to the predetermined current, the powered device is configured for providing an input voltage value proportional to a reference voltage value, the measuring mechanism further comprises a voltage measuring circuit for measuring a first voltage value between the first and second pairs at an output of the power supply device in response to the predetermined current, and the voltage measuring circuit is configured for measuring a second voltage value between the first and the second pair at the output of the power supply device when the predetermined current is turned off, the second voltage value corresponding to the reference voltage value.

13. The system of claim 12, wherein the measuring mechanism is configured for determining resistance of the first and second pairs based on a difference between the first voltage value and the input voltage value proportional to the second voltage value, and a value of the pre-determined current.

* * * * *